United States Patent Office 3,228,961
Patented Jan. 11, 1966

3,228,961
DIETHYLAMINO AND PYRROLIDINO LOWER ALKYL ESTERS OF 3,5-DIMETHOXY-4-BUTOXY AND AMYLOXY BENZOIC ACIDS
László Vargha, Endre Kastreiner, József Borsi, Boris Dumbovich, and Antal Sólyom, all of Budapest, Hungary, assignors to Egyesült Gyógyszer- és Tápszergyár, Budapest, Hungary
No Drawing. Filed May 22, 1963, Ser. No. 282,837
3 Claims. (Cl. 260—326.3)

This invention relates to new and useful compounds which are valuable therapeutic agents. More particularly it concerns new, pharmacologically active basic esters of 3,5-dimethoxy-4-alkoxy-benzoic acids.

It is known that certain basic esters of the 3,4,5-trimethoxy benzoic acid have hypotensive and sedative effects (cf. F. M. Miller, M. S. Weinberg: Abstracts of Papers of 130th Meeting of Amer. Chem. Soc., Atlantic City, 1956, p. 11; A. Lasslo, W. D. Jordan: J. Org. Chem. 21, 805 (1956); B. V. Rama Sastry, A. Lasslo: J. Org. Chem. 23, 1577 (1958); Z. J. Vejdelek, V. Trcka: Chem. Listy, 52, 1622 (1958).

It has been found surprisingly that the hitherto unknown analogous compounds, containing a higher alkoxy radical instead of the methoxy group in the 4-position of the aromatic ring, show a potent spasmolytic effect against the spasms of the smooth muscles, accompanied by local anesthetic and hypotensive effects too. These new compounds may be characterized by the general Formula I

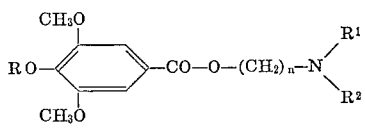   I wherein R stands for a saturated or unsaturated straight or branched chain alkyl group having 2 to 5 carbon atoms, optionally substituted by a nitrogen-containing basic (e.g. dimethyl amino or diethyl amino) group; $R^1$ and $R^2$ represent equal or different straight or branched chain saturated alkyl groups, or the groups $R^1$ and $R^2$ together with the nitrogen atom to which they are attached collectively represent a heterocyclic group possibly including a further hetero atom too, such as piperidino, pyrrolidino, morpholino or methyl morpholino; $n=2$ or 3.

These new compounds may be prepared according to the present invention by introducing the alkyl group R with the aid of alkylating agents into the molecule of 3,5-dimethoxy-4-hydroxy-benzoic acid (syringic acid) and esterifying the 3,5-dimethoxy-4-alkoxy-benzoic acid obtained thereby with a basic alcohol of the Formula II

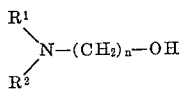   II wherein $R^1$, $R^2$ and $n$ have the same meaning as above. The 3,5-dimethoxy-4-alkoxy-benzoic acids as well as their basic esters obtained in this way are new compounds unknown hitherto.

The 4-alkoxy-3,5-dimethoxy-benzoic acids used as intermediate products may be prepared in different ways. It is possible to react the 3,5-dimethoxy-4-hydroxy-benzoic acid in an alkaline medium with the corresponding alkyl halogenide or dialkyl sulphate. In this case the carboxyl group is also alkylated simultaneously or even previously and the corresponding alkyl ester of the 4-alkoxy-3,5-dimethoxy-benzoic acid is obtained. It is, however, more convenient to alkylate with the desired alkyl halogenide or dialkyl sulphate a lower alkyl (e.g. methyl, ethyl or butyl) ester of the 3,5-dimethoxy-4-hydroxy-benzoic acid rather than the free acid itself; the ester group may be then split off by hydrolysis.

This latter procedure may be performed in an especially preferable way by esterifying the 3,5-dimethoxy-4-hydroxy-benzoic acid with butyl alcohol and alkylating the formed ester immediately in the butanolic reaction medium, without isolating the intermediate ester. The use of butanol has two advantages: the water formed in the course of the esterification can be removed currently by azeotropic distillation of the butanol and, on the other hand, due to its high boiling point the butanol is an especially convenient medium for carrying out the alkylation reaction.

The conversion of the said 3,5-dimethoxy-4-alkoxy-benzoic acids into the basic esters of the Formula I may be performed by methods known in themselves and used for the preparation of esters. It is e.g. possible to heat the 3,5-dimethoxy-4-alkoxy-benzoic acid together with the basic alcohol, possibly in the presence of a suitable catalyst; the water formed in the course of the reaction may be removed currently by azeotropic distillation. The esterification may be carried out also by reacting the acid or its salts with a basic alkyl halogenide of the Formula III

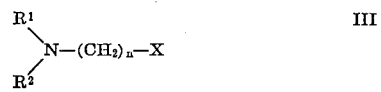   III (wherein X is a halogen atom). It is especially convenient to react a reactive derivative e.g. a halogenide of the 3,5-methoxy-4-alkoxy-benzoic acid with an alcohol of the Formula II

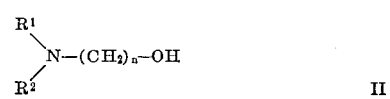   II or with a salt of these alcohols.

The water soluble acid addition salts of the basic esters of the Formula I, formed with non-toxic acids may be used preferably for parenteral administration.

The spasmolytic effect of these compounds has been examined in vitro on isolated rabbit intestines according to the method of Magnus. Barium chloride has been used as musculotropic stimulant and the 50 percent spasmolytic efficiency has been determined. The toxicity in the case of intravenous or oral administration, respectively, has been determined on mice. As it is known, the quotient of these two values may be taken as a measure of the resorption of the compounds. The average lethal doses ($LD_{50}$ values) have been calculated by the "probit" method of Lichtenfeld-Wilcoxon.

The toxicity, the resorption in the case of oral administration and the spasmolytic efficiency of some compounds are shown by the table below. The values given there are calculated on the compounds as free bases.

| Compound | 50 percent spasmolytic doses, ED$_{50}$, meg./ml. | Relative efficiency Papaverine-1 | LD$_{50}$ I.V., mg./kg. | LD$_{50}$ per os, mg./kg. | LD$_{50}$ per os/ LD$_{50}$ I.V., quotient |
|---|---|---|---|---|---|
| Papaverine HCl | 10.0 | 1.0 | 29.0 | 440.0 | 15.2 |
| 3,5-dimethoxy-4-n-butoxy-benzoic acid diethylamino-ethyl ester | 2.2 | 4.55 | 13.5 | 800.0 | 59.0 |
| 3,5-dimethoxy-4-n-butoxy-benzoic acid (N-pyrrolidino)-ethyl ester | 2.5 | 4.0 | 21.0 | 280.0 | 13.4 |
| 3,5-dimethoxy-4-primary-iso-butoxy-benzoic acid diethyl-amino-ethyl ester | 2.2 | 4.55 | 16.0 | 370.0 | 23.1 |
| 3,5-dimethoxy-4-primary-iso-butoxy-benzoic acid (N-pyrrolidino)-ethyl ester | 2.6 | 3.85 | 25.2 | 324.0 | 12.9 |
| 3,5-dimethoxy-4-n-amyloxy-benzoic acid diethylamino-ethyl ester | 1.8 | 5.55 | 18.1 | 900.0 | 50.0 |
| 3,5-dimethoxy-4-n-amyloxy-benzoic acid (N-pyrrolidino)-ethyl ester | 2.0 | 5.0 | 19.8 | 1,215.0 | 61.2 |

It can be seen from the table that the spasmolytic activity of the compounds listed in the table is considerably higher than that of the papaverine (3.85–5.55 relative activity values) and some compounds show a satisfactory resorption in the case of oral administration. The (N-pyrrolidine)-ethyl esters of 3,5-dimethoxy-4-n-butoxy-benzoic acid and of 3,5-dimethoxy-4-primary-iso-butoxy-benzoic acid show the most favourable properties in this respect. The table thus shows the results obtained when the ester is of the formula

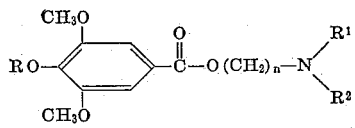

wherein R is a butyl or amyl radical and NR$^1$R$^2$ is a diethylamino or pyrrolidino group, $n$ being an integer from 2 to 3.

Further details of the procedure of the preparation of the new compounds according to the present invention are shown by the following examples.

EXAMPLE 1

*3,5-dimethoxy-4-n-propoxy-benzoic acid*

Metallic sodium (6.95 g.) is dissolved in n-butanol (300 ml.) and 3,5-dimethoxy-4-hydroxy-benzoic acid methyl ester (53 g.) and n-propyl bromide (30 ml.) are added to the solution. The mixture is refluxed under stirring for 15 hours. The cooled mixture is filtered, evaporated in vacuo, the residue dissolved in ether (250 ml.), the ether solution washed with aqueous N sodium hydroxide solution (250 ml.) and evaporated again in vacuo. The raw methyl ester of 3,5-dimethoxy-4-n-propoxy-benzoic acid obtained as residue is dissolved in methanol (460 ml.), 43.8% sodium hydroxide solution (29 ml.) is added and the ester is hydrolized by boiling for 1.5 hours. The solvent is then removed in vacuo, the residue dissolved in water (250 ml) and acidified with conc. hydrochloric acid. 43.95 g. of 3,5-dimethoxy-n-propoxy-benzoic acid is obtained. This product can be crystallized from the mixture of benzin and ethyl acetate; M.P. 124–126° C.

EXAMPLE 2

*3,5-dimethoxy-4-allyloxy-benzoic acid*

Metallic sodium (6.9 g.) is dissolved in methanol (115 ml.), 3,5-dimethoxy-4-hydroxy-benzoic acid methyl ester (53 g.) dissolved in methanol (200 ml.) is added to the solution. To the refluxed mixture, in which a precipitate has been formed, allyl bromide (28 ml.) is added drop by drop within 2.5 hours. The mixture is then refluxed for further 2 hours, then evaporated in vacuo, the residue is dissolved in a mixture of chloroform (300 ml.) and aqueous N sodium hydroxide solution (250 ml.). The separated chloroform layer is dryed with ignited magnesium sulfate, filtered and evaporated in vacuo. A yield of 60.95 g. of 3,5-dimethoxy-4-allyloxy-benzoic acid methyl ester is obtained, M.P. after crystallisation from methanol 77–78° C.

A mixture of this methyl ester (51 g.), methanol (770 ml.) and 47% aqueous potassium hydroxide solution (35.7 g.) is refluxed for 1.5 hours, then evaporated in vacuo; the residue is dissolved in water (250 ml.) and acidified with conc. hydrochloric acid. 44.94 of 3,5-dimethoxy-4-allyloxy-benzoic acid is obtained as a precipitate; M.P. after crystallisation from aqueous methanol 123–125° C.

EXAMPLE 3

*3,5-dimethoxy-4-allyloxy-benzoic acid dimethylamino-ethyl ester*

The mixture of 3,5-dimethoxy-4-allyloxy-benzoic acid (20 g.), dry benzene (20 ml.) and thionyl chloride (20 ml.) is boiled until the gas evolution ceases; the reaction mixture is then evaporated in vacuo and the residue crystallized from petroleum ether (20 ml.). A yield of 18.15 g. 3,5-dimethoxy-4-allyloxy-benzoyl-chloride is obtained, M.P. 60–62° C.

This acid chloride (7.55 g.) is dissolved in dry benzene (110 ml.), to this solution dimethylamino-ethanol (6 ml.) is added dropwise under ice-cooling and under repeated shaking and the mixture is refluxed for 1 hour. The formed basic ester is extracted with two 50 ml. portions of 4% hydrochloric acid, the aqueous acid solution is made alkaline with potassium carbonate and the basic ester is extracted with two 5 ml. portions of ether. The unified ether extracts are dried over ignited potassium carbonate and evaporated. The basic ester obtained as an oily residue is dissolved in dry ether (50 ml.) and maleic acid (4 g.) dissolved in the mixture of ether (100 ml.) and ethanol (4 ml.) is added to the solution. The precipitated raw salt is crystallized from butanone (15 ml.), to yield 8.34 g. maleate of the basic ester, M.P. 105–107° C.

EXAMPLE 4

*3,5-dimethoxy-4-n-butoxy-benzoic acid*

METHOD A

The procedure described in Example 1 is repeated but using n-butyl bromide (34 ml.) instead of the n-propyl bromide.

After hydrolysis of the raw methyl ester a yield of 45.85 g. of the acid is obtained: the product can be crystallized from 70% aqueous methanol, M.P. 107–109° C.

METHOD B

The mixture of 3,5-dimethoxy-4-hydroxy-benzoic acid methyl ester (53 g.), n-butanol (300 ml.), 50% aqueous sodium hydroxide, 20 g.) and n-butyl bromide (34 ml.) is refluxed under stirring for 16 hours. Proceeding further as described in Example 1, the hydrolysis of the raw methyl ester yields 49.9 g. of the acid.

METHOD C

The mixture of 3,5-dimethoxy-4-hydroxy-benzoic acid methyl ester (53 g.), acetophenone (180 ml.), finely pulverized dry potassium carbonate (44 g.) and n-butyl bromide (34 ml.) is stirred for 17 hours on a bath of 140–145° C. The cooled reaction mixture is filtered by suction and evaporated over a boiling steam bath in vacuo (4–5 mm. of mercury). The residue is dissolved in ether (250 ml.), the solution is shaken out with aqueous N sodium hydroxide solution and evaporated again. The raw methyl ester of 3,5-dimethoxy-4-hydroxy benzoic acid obtained as a distillation residue is hydrolyzed as described in Example 1. Yield: 58.75 g. of the acid.

METHOD D

The mixture of 3,5-dimethoxy-4-hydroxy-benzoic acid (39.6 g.), dry n-butanol (200 ml.) and p-toluene sulfonic acid (2 g.) is distilled slowly for 6 hours. The butanol distilled off is replaced by adding gradually fresh butanol. 50% aqueous sodium hydroxide (17 g.) and n-butyl bromide (27.2 ml.) are then added to the reaction mixture, which is refluxed while stirring for further 14 hours. The cooled reaction mixture is filtered by suction, the filtrate is evaporated in vacuo and the residue dissolved in a mixture of water (300 ml.) and ether (300 ml.). The separated ether solution is shaken out with 2% aqueous sodium hydroxide solution (200 ml.) and evaporated again. The raw butyl ester of 3,5-dimethoxy-4-n-butoxy-benzoic acid is obtained as a residue. The hydrolysis is carried out as described in Example 1. Yield: 55.53 g. of the acid.

EXAMPLE 5

*3,5-dimethoxy-4-n-butoxy-benzoic acid diethylamino-ethyl ester*

The mixture of 3,5-dimethoxy-4-n-butoxy-benzoic acid (10.67 g.), dry benzene (10 ml.) and thionyl chloride (10 ml.) is boiled until the gas evolution ceases; the solvent and the excess of thionyl chloride is then distilled off in vacuo. The raw acid chloride obtained as residue is then dissolved in dry benzene (90 ml.) and the mixture of dimethylamino ethanol (7.1 g.) and benzene (10 ml.) is added dropwise under ice-cooling and repeated shaking. The mixture is refluxed for 1 hour and the raw basic ester is isolated as described in Example 3. This product is then dissolved in ether (100 *ml.*) and maleic acid (6 g.) dissolved in acetone (15 ml.) is added to the solution, the precipitated raw product is recrystallized from butanone (15 ml.). Yield of 7.1 g. maleate of the basic ester is obtained, M.P. 87–88° C.

EXAMPLE 6

*3,5-dimethoxy-4-n-butoxy-benzoic acid diethylamino-ethyl ester*

METHOD A

Metallic sodium (0.53 g.) is dissolved in iso-propanol (50 ml.), to this solution 3,5-dimethoxy-4-n-butoxy-benzoic acid (5.95 g.) and diethylamino-ethyl chloride hydrochloride (4 g.) are added and the mixture is refluxed for 12 hours. After cooling the reaction mixture is filtered with suction and the filtrate evaporated in vacuo. On recrystallizing the residue from a mixture of acetone (28 ml.) and iso-propanol (3 ml.), a yield of 4.3 g. hydrochloride of the basic ester is obtained, M.P. 134–139° C.

METHOD B

The mixture of 3,5-dimethoxy-4-n-butoxy-benzoic acid (13.97 g.), diethylamino-ethanol (5.8 g.) and xylol (80 ml.) is boiled for 7 hours, while the water formed in the course of the esterification is removed continuously with the vapours of the toluene. The reaction mixture is then treated further as described in Example 3. The raw basic ester obtained (7.3 g.) is dissolved in dry ether (100 ml.) and an excess of ethanolic hydrochloric acid is added to the solution. The precipitated raw salt is recrystallized from a mixture of acetone (25 ml.) and ethanol (3 ml.). A yield of 5.95 g. hydrochloride of the basic ether is obtained, M.P. 138–140° C.

EXAMPLE 7

*3,5-dimethoxy-4-n-butoxy-benzoic acid (N-pyrrolidino)-ethyl ester*

METHOD A

The acid chloride is prepared as described in Example 5 from 3,5-dimethoxy-4-n-butoxy-benzoic acid (20 g.); this product is then dissolved in dry benzene (140 ml.) and dry triethyl amine (11.6 ml.) and subsequently N-(2-hydroxy-ethyl)-pyrrolidine (8.7 g.) are added dropwise under stirring and ice-cooling to this solution. The mixture is then further stirred at room temperature for 1 hour and subsequently refluxed for 1 hour. The reaction mixture, in which a precipitate has been formed, is then filtered with suction and the benzene solution is evaporated in vacuo. The distillation residue is dissolved in dry ether (200 ml.), filtered and maleic acid (9.85 g.) dissolved in acetone (30 ml.) is added to the filtrate. The precipitated raw salt is crystallized from ethyl acetate (45 ml.); a yield of 27.43 g. maleate of the basic ester is obtained, M.P. 106–107° C.

If ethanolic hydrochloric acid is added to the dry ether solution of the raw basic ester, the hydrochloride is obtained. This product can be crystallized from acetone, M.P. 121–123° C.

METHOD B

The raw acid chloride is prepared as previously described from 3,5-dimethoxy-4-n-butoxy-benzoic acid (9.52 g.) and this salt is reacted with N-(2-hydroxyethyl)-pyrrolidine (4.31 g.). The distillation residue is twice crystallized from acetone (30 ml. each). Yield: 7.68 g. hydrochloride of the basic ester, M.P. 120–122° C.

EXAMPLE 8

*3,5-dimethoxy-4-n-butoxy-benzoic acid di-iso-propyl-amino-ethyl ester*

The raw acid chloride is prepared as described in Example 5 from 3,5-dimethoxy-4-n-butoxy-benzoic acid (10.64 g.) and this salt is reacted with di-iso-propylamino-ethanol (11.6 g.). The reaction mixture is treated further as described in Example 3. 14.52 g. of the raw oily basic ester is obtained. This product is dissolved in dry ether (100 ml.) and fumaric acid (4.4 g.) dissolved in ethanol (100 ml.) is added to the solution. The precipitated raw salt is crystallized from ethanol (180 ml.). Yield: 14.6 g. fumarate of the basic ester, M.P. 163–165° C.

EXAMPLE 9

*3,5-dimethoxy-4-n-butoxy-benzoic acid (N-piperidine)-ethyl ester*

The acid chloride is prepared as described in Example 5 from 3,5-dimethoxy-4-n-butoxy-benzoic acid (10.67 g.) and this salt is reacted with N-(2-hydroxyethyl)-piperidine (10.3 g). The reaction mixture is treated further as described in Example 3. 14.5 g. of raw oily basic ester is obtained. This product is then dissolved in dry ether (170 ml.) and maleic acid (6.9 g.) dissolved in acetone (20 ml·) is added to the solution. The precipitated crystalline product is recrystallized from acetone (25 ml.). Yield: 15.78 g. maleate of the basic ester, M.P. 116–118° C.

EXAMPLE 10

*3,5-dimethoxy-4-n-butoxy-benzoic acid 3'-dimethylamino-propyl ester*

The acid chloride is prepared as described in Example 5 from 3,5-dimethoxy-4-n-butoxy-benzoic acid (10 g.) and this salt is reacted with 3-dimethylamino-propanol (7.7 g.). The reaction mixture is treated further as described in Example 3. 11.18 g. of the raw oily basic ester is obtained. This product is then dissolved in dry ether (200 ml.) and an excess of ethanolic hydrochloric acid is added to the solution. The precipitated raw product is recrystallized from butanone (14 ml.). Yield: 5.55 g. hydrochloride of the basic ester, M.P. 139–141° C.

EXAMPLE 11

*3,5-dimethoxy-4-n-butoxy-benzoic acid 1'-diethylamino-propyl-(2') ester*

The raw acid chloride of 3,5-dimethoxy-4-n-butoxybenzoic acid (5.32 g.) is reacted with 1-diethylamino-propan-2-ol. (2.62 g.). The distillation residue of the chloroform solution is recrystallized from acetone (40 ml.). Yield: 5.28 g. hydrochloride of the basic ester, M.P. 148–150° C.

EXAMPLE 12

*3,5-dimethoxy-4-primary-iso-butoxy-benzoic acid*

The procedure described in Example 1 is repeated with the difference that primary-iso-butyl-iodide (37.5 ml.) is used instead of the n-propyl bromide, and the reaction mixture is refluxed for 45 hours. A yield of 31.38 g. of the acid is obtained. This product can be crystallized from 70% aqueous methanol, M.P. 123–125° C.

EXAMPLE 13

*3,5-dimethoxy-4-primary-iso-butoxy-benzoic acid diethylamino-ethyl ester*

The raw acid chloride of 3,5-dimethoxy-4-primary-iso-butoxy-benzoic acid (8 g.) is reacted with diethylamino-ethanol (3.99 g.). The distillation residue of the chloroform solution is recrystallized from acetone (31 ml.). Yield: 7.37 g. hydrochloride of the basic ester. M.P. 152–154° C.

EXAMPLE 14

*3,5-dimethoxy-4-primary-iso-butoxy-benzoic acid (N-pyrrolidino)-ethyl ester*

The raw acid chloride of 3,5-dimethoxy-4-primary-iso-butoxy-benzoic acid (12 g.) is reacted with N-(2-hydroxyethyl)-pyrrolidine (5.43 g.). The distillation residue of the chloroform solution is crystallized from butanone (40 ml.). Yield: 8.65 g. hydrochloride of the basic ester. M.P. 153–154° C.

EXAMPLE 15

*3,5-dimethoxy-4-sec.-butoxy-benzoic acid*

The procedure according to Method C of Example 4 is repeated with the difference that sec.-butyl-bromide (41 ml.) is used instead of the n-butyl-bromide, and sodium iodide (7.5 g.) is also added to the reaction mixture. 27.5 g. raw acid are obtained on hydrolysis of the raw methyl ester. This product can be crystallized from a 9:1 mixture of benzin and acetone, M.P. 127–128° C.

EXAMPLE 16

*3,5-dimethoxy-4-sec.-butoxy-benzoic acid diethylamino-ethyl ester*

The raw acid chloride of 3,5-dimethoxy-4-sec.-butoxy-benzoic acid (8.7 g.) is reacted with diethylamino-ethanol (3.68 g.). The distillation residue of the chloroform solution is crystallized from acetone (35 ml.). Yield: 7.45 g. hydrochloride of the basic ester. M.P. 152–153° C.

EXAMPLE 17

*3,5-dimethoxy-4-sec.-butoxy-benzoic acid (N-pyrrolidino)-ethyl ester*

The raw acid chloride of 3,5-dimethoxy-4-sec.-butoxy-benzoic acid (8 g.) is reacted with N-(2-hydroxyethyl)-pyrrolidine (3.62 g.). The distillation residue of the chloroform solution is recrystallized twice from butanone (30 ml. each). Yield: 4.7 g. hydrochloride of the basic ester, M.P. 127–129° C.

EXAMPLE 18

*3,5-dimethoxy-4-n-amyloxy-benzoic acid*

The procedure of Example 1 is repeated but using n-amyl bromide (39 ml.) instead of the n-propyl bromide. 41.5 g. of the acid are obtained on hydrolysis of the raw methyl ester. This product can be crystallized from a 10:1 mixture of benzin and acetone, M.P. 104–107° C.

EXAMPLE 19

*3,5-dimethoxy-4-n-amyloxy-benzoic acid diethylamino-ethyl ester*

The raw acid chloride of 3,5-dimethoxy-4-n-amyloxy-benzoic acid (13.4 g.) is reacted with diethylamino-ethanol (5.85 g.). The distillation residue of the chloroform solution is crystallized from acetone (20 ml.). Yield: 15.4 g. hydrochloride of the basic ester, M.P. 126–128° C.

EXAMPLE 20

*3,5-dimethoxy-4-n-amyloxy-benzoic acid (N-pyrrolidino)-ethyl ester*

The raw acid chloride of 3,5-dimethoxy-4-n-amyloxy-benzoic acid (13.4 g.) is reacted with N-(2-hydroxyethyl)-pyrrolidine (5.75 g.). The distillation residue of the chloroform solution is crystallized from butanone (40 ml.) containing 1% of water. Yield: 6.36 g. hydrochloride of the basic ester, M.P. 121–123° C.

What we claim is:
1. An ester of the formula

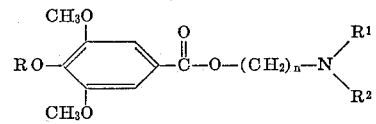

wherein R is a butyl or amyl radical and $NR^1R^2$ is a diethylamino or pyrrolidino group, $n$ being an integer from 2 to 3.

2. The (N-pyrrolidino)-ethyl ester of 3,5-dimethoxy-4-n-butoxy-benzoic acid.

3. The (N-pyrrolidino)-ethyl ester of 3,5-dimethoxy-4-n-amyloxy-benzoic acid.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,816,133 | 12/1957 | Nielsen | 260—473 |

OTHER REFERENCES

De Varela: "Rev. Asoc. Bioquim Arg.," vol. No. 129–130, pages 121–2 (1960).

NICHOLAS S. RIZZO, *Primary Examiner.*

JOHN D. RANDOLPH, *Examiner.*